US012155611B2

(12) United States Patent
Nangunoori (10) Patent No.: US 12,155,611 B2
(45) Date of Patent: Nov. 26, 2024

(54) INFORMATION EXCHANGE BETWEEN DISJOINT TECHNOLOGIES USING A UNIVERSAL COMMUNICATION RECIPIENT IDENTIFIER

(71) Applicant: Srikanth Nangunoori, Portland, OR (US)

(72) Inventor: Srikanth Nangunoori, Portland, OR (US)

( * ) Notice: Subject to any disclaimer, the term of this patent is extended or adjusted under 35 U.S.C. 154(b) by 0 days.

(21) Appl. No.: 18/075,782

(22) Filed: Dec. 6, 2022

(65) Prior Publication Data

US 2023/0179552 A1    Jun. 8, 2023

Related U.S. Application Data

(60) Provisional application No. 63/286,689, filed on Dec. 7, 2021.

(51) Int. Cl.
*H04L 51/066* (2022.01)
*H04L 51/48* (2022.01)
*H04L 51/56* (2022.01)
*H04L 61/00* (2022.01)

(52) U.S. Cl.
CPC ............ *H04L 51/066* (2013.01); *H04L 51/48* (2022.05); *H04L 51/56* (2022.05); *H04L 61/35* (2013.01)

(58) Field of Classification Search
CPC ....... H04L 51/066; H04L 51/48; H04L 51/56; H04L 61/35; H04L 51/04; H04L 51/046; H04L 51/58; H04L 51/06
See application file for complete search history.

(56) References Cited

U.S. PATENT DOCUMENTS

| 7,734,705 B1* | 6/2010 | Wheeler, Jr. .......... G06Q 10/107 709/206 |
| 2005/0180395 A1* | 8/2005 | Moore .................... H04L 51/48 370/352 |
| 2007/0010265 A1* | 1/2007 | Henderson .............. H04L 51/48 455/466 |
| 2009/0137229 A1* | 5/2009 | Ye ........................ H04M 3/5307 709/227 |
| 2009/0181702 A1* | 7/2009 | Vargas .................... H04L 51/56 455/466 |

(Continued)

*Primary Examiner* — Johnny B Aguiar
(74) *Attorney, Agent, or Firm* — Mohr Intellectual Property Law Solutions, PC (57) ABSTRACT

A system and method for communicating is provided. A recipient user is universally identified using a unique universal communication identifier. When a sending user wishes to send an initial communication to the recipient user, the sending user identifies the recipient user by that user's universal communication identifier. Since the sending user directs their initial communication to the recipient user by using the assigned universal communication identifier, the sending user does not need to know or have access to the recipient's different unique identifiers that the recipient uses for the various communication exchange technologies that the recipient uses from time to time. That is, the single universal communication identifier associated with the recipient user has been previously associated with the different unique identifiers that the recipient uses for their various communication exchange technologies.

13 Claims, 4 Drawing Sheets

(56) References Cited

U.S. PATENT DOCUMENTS

| | | | |
|---|---|---|---|
| 2009/0271486 A1* | 10/2009 | Ligh | H04M 1/7243 345/173 |
| 2011/0194629 A1* | 8/2011 | Bekanich | H04M 3/5116 375/259 |
| 2011/0289170 A1* | 11/2011 | Smith | H04L 51/066 709/206 |
| 2016/0226812 A1* | 8/2016 | Attolini | G06Q 50/01 |
| 2016/0285791 A1* | 9/2016 | Teng | H04L 51/04 |

* cited by examiner

INFORMATION EXCHANGE BETWEEN DISJOINT TECHNOLOGIES USING A UNIVERSAL COMMUNICATION RECIPIENT IDENTIFIER

PRIORITY CLAIM

This application claims priority to U.S. Provisional Application, Ser. No. 63/286,689, filed on Dec. 7, 2021, entitled Apparatus and Method for Universal Information Exchange, which is hereby incorporated by reference in its entirety for all purposes.

BACKGROUND OF THE INVENTION

Proliferation of communication exchange technologies has created a variety of different systems to facilitate communication exchanges between individuals and other entities. One example communication exchange technology is the well-known telephony system wherein two or more parties may communicate in real time with voice and/or video communications. Another example communication exchange technology are the well-known electronic mail (e-mail) systems that enable parties to communicated text, image, and/or video information. As yet another example, Short Message Peer-to-Peer (SMPP) protocol is an internet standard communication protocol for short text messaging between parties. Mail servers and other message transfer agents use SMTP to send and receive short text messages. Social media platforms also permit communications between their social media platform members.

However, these different communication exchange technologies are incompatible with each other. That is, cross communications between different communication exchange technologies is not always possible. For example, a first party using the telephony system may not be able to receive an email message from a second party who is using an email system. As another example, a party using their email system cannot send an email message to another party who is using their social media platform that supports communications between social media platform members.

Further, the various communication exchange technologies all use unique identifiers which identify individuals and entities. The identifiers are used to direct flow of communications between parties. For example, the telephony system uses a phone number uniquely assigned to a particular party using the telephony system. In contrast, email systems use email addresses that are uniquely assigned to parties using the email system. The unique identifiers are not compatible with each other even though the two different identifiers may be associated with the same party.

Further, a single party may have a plurality of unique identifiers for a single communication exchange technology. For example, a single individual may have multiple e-mail addresses, such as for their personal email and their work email.

This incompatibility between communication exchange technologies, coupled with the existence of a plurality of different unique identifiers that are associated with a single party, makes communication between parties very complicated and difficult, if not impossible.

Accordingly, in the arts of communication exchange technologies, there is a need in the arts for improved methods, apparatus, and systems for enabling communications between parties over a plurality of different communication exchange technologies, and/or when individual parties have a plurality of unique identifiers that are used by a particular communication exchange technology to identify that particular party.

SUMMARY OF THE INVENTION

Embodiments of the universal information exchange system provide a system and method for communicating. A system and method for communicating is provided. A recipient user is universally identified using a unique universal communication identifier. When a sending user wishes to send an initial communication to the recipient user, the sending user identifies the recipient user by that user's universal communication identifier. Since the sending user directs their initial communication to the recipient user by using the assigned universal communication identifier, the sending user does not need to know or have access to the recipient's different unique identifiers that the recipient uses for the various communication exchange technologies that the recipient uses from time to time. That is, the single universal communication identifier associated with the recipient user has been previously associated with the different unique identifiers that the recipient uses for their various communication exchange technologies.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
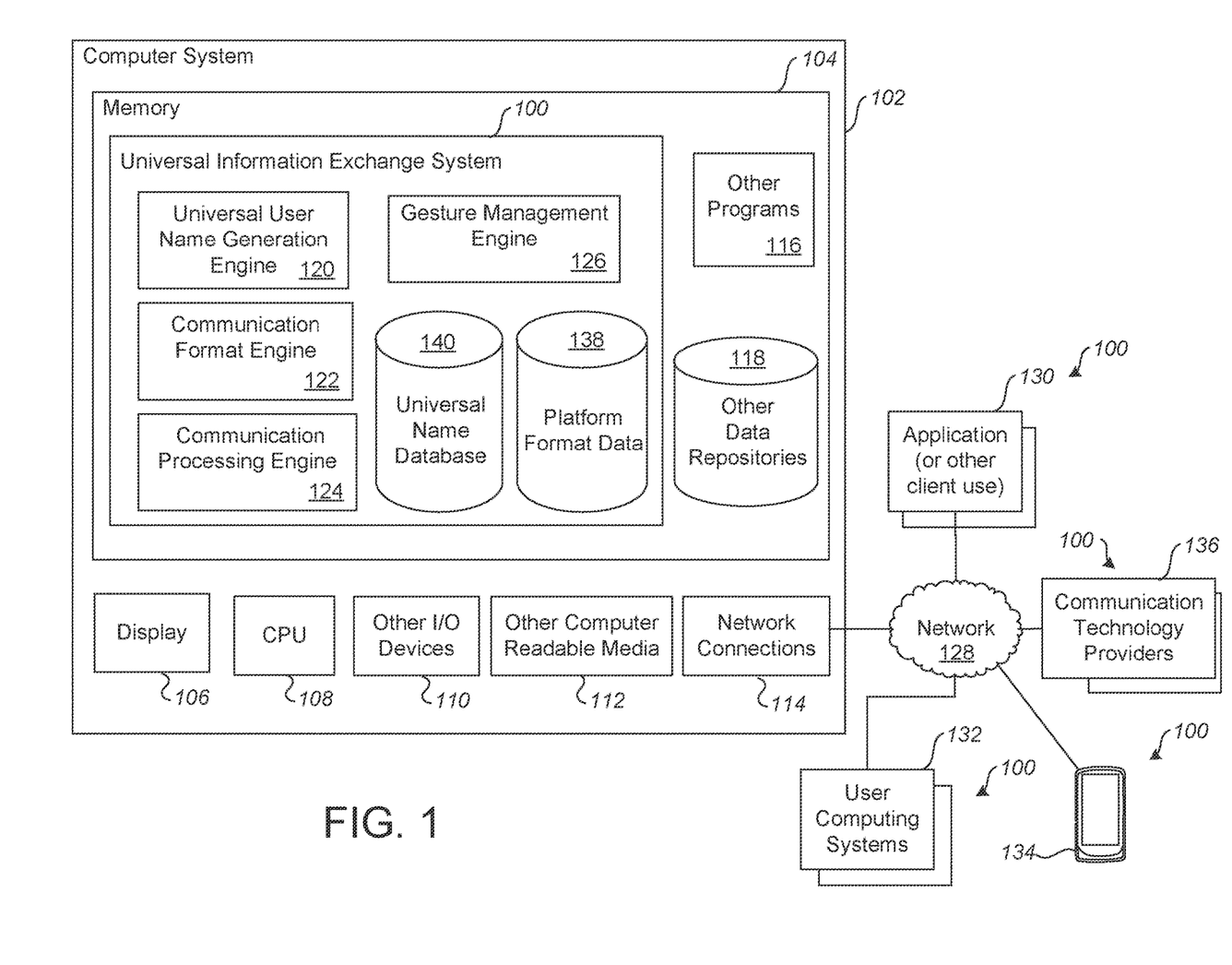
FIG. 1 is a block diagram of a universal information exchange system.

FIG. 1 is a block diagram of a universal information exchange system 100. Embodiments of the universal information exchange system 100 comprise one or more secured computer systems 102. Embodiments of the universal information exchange system 100 facilitate communications between a sending party (interchangeably referred to herein as a sender or sending user) and a receiving party (interchangeably referred to herein as a recipient or recipient user) who are using different, or even the same, communication exchange technologies.

As defined herein, a communication exchange technology is software or an application that is executed by any computer, or electronic device or system, that supports communications between two or more parties. A non-limiting example of a communication exchange technology is an email system that supports email messages (with document attachments). Another communication exchange technology is the telephony system that supports voice communications, text communications, image communications, and/or video communications. Communication exchange technologies can include one of the many different types of social media platforms that support communications between social media members.

In the various embodiments of the universal information exchange system 100, a user is an individual or other entity that is universally identified using a universal communication identifier. When a sending user wishes to send a communication to a recipient user (defined herein as an initial communication), the sending user identifies the recipient user by that user's universal communication identifier. Since the sending user directs their initial communication to the recipient user by using the assigned universal communication identifier that has been associated with the recipient user, the sending user does not need to know or have access to the recipient's different unique identifiers that the recipient uses for the various communication exchange technologies that the recipient uses from time to time. That is, the single universal communication identifier associated with the recipient user has been previously associated with the different unique identifiers that the recipient uses for their various communication exchange technologies.

The recipient user's universal communication identifier is associated with a plurality of different system specific and unique communication system identifiers (ID) associated with that recipient user. One skilled in the art appreciates that with legacy communication exchange technologies, any particular user may be associated with a plurality of different unique identifiers, wherein each identifier is used to identify that user on a particular communication exchange technology. For example, the user may have one or more different phone numbers (an identifier) that identify the user on a telephony system (the communication exchange technology). Alternatively, or additionally, the user may have one or more different email accounts, each with a unique user email name (the identifier) that identifies or is associated with the user on an email platform (the communication exchange technology). As yet another example, the user may have a different handle (user name) for each one of a plurality of different social media platforms (communication exchange technology). The users' universal communication identifier is associated with a plurality of unique identifiers that are associated with that particular user so that a sender may send a communication to the recipient using the recipient's universal communication identifier.

For example, the electronic device of the recipient user may be one of a computer or a smartphone that communicatively couples electronic device of the recipient user to a social media platform. The universal information exchange system 100 processes the initial communication into a message that is formatted for the social media platform. Here, the recipient communication is a message that is communicated to the social media platform and that identifies the recipient user by a social media site user name associated with the recipient user. The recipient user will then receive the recipient message on the proprietary messaging system used by the social media platform.

As noted above, a sending user transmits an initial communication from their communication exchange technology that they are currently using. The initial communication includes the universal communication identifier associated with the recipient. Information in the universal communication identifier directs the initial communication to the recipient user who is identified by their universal communication identifier. The universal information exchange system 100, depending upon the type of communication exchange technologies and/or recipient user preferences, sends the content of the initial communication to the intended recipient user using a communication exchange technology that has been previously selected or specified in advance by the recipient user. Here, the selected or specified communication exchange technology is defined herein as a recipient user preference.

In the various embodiments, the sending user's initial communication is communicated, under management by the universal information exchange system 100, to a predefined preferred communication exchange technology platform of the recipient user. Here, embodiments of the universal information exchange system 100 identify the recipient user based on the recipient user's universal communication identifier that is included in the sending user's initial communication. Based on the recipient user's universal communication identifier, embodiments of the universal information exchange system 100 look up the intended recipient user's identity (ID). Based on predefined recipient user preferences, the content of the sending user's initial communication is used to generate a recipient communication.

The format of the recipient communication is configured for the particular preferred communication exchange technology platform preferred by the recipient user. A device address is associated with the preferred communication exchange technology platform. The content is then sent to the recipient user using the device address, wherein the recipient communication is received by the identified communication exchange technology platform for processing and presentation to the recipient user. The recipient communication may be reformatted from a format used by the sending user's communication exchange technology to a format used by the preferred communication exchange technology of the recipient user.

In some instances, the sending user may specify a particular preferred communication exchange technology that is to be used to send the initial communication to the recipient user. Embodiments of the universal information exchange system 100 then determine the recipient user's ID for the specified preferred communication exchange technology platform, and then may send the recipient communication to the recipient user via the specified preferred communication exchange technology platform. The recipient communication may be reformatted from a format used by the sending user's communication exchange technology to a format used by the specified communication exchange technology of the recipient user.

In practice, the recipient user will have a unique universal communication identifier, such as @<recipientuser.xyz> in this simplified hypothetical conceptual example, wherein the term "xyz" is a top level domain name associated with a host, here the universal information exchange system 100. The term "recipient user" is a name that is uniquely associated with the recipient.

Figure 2:
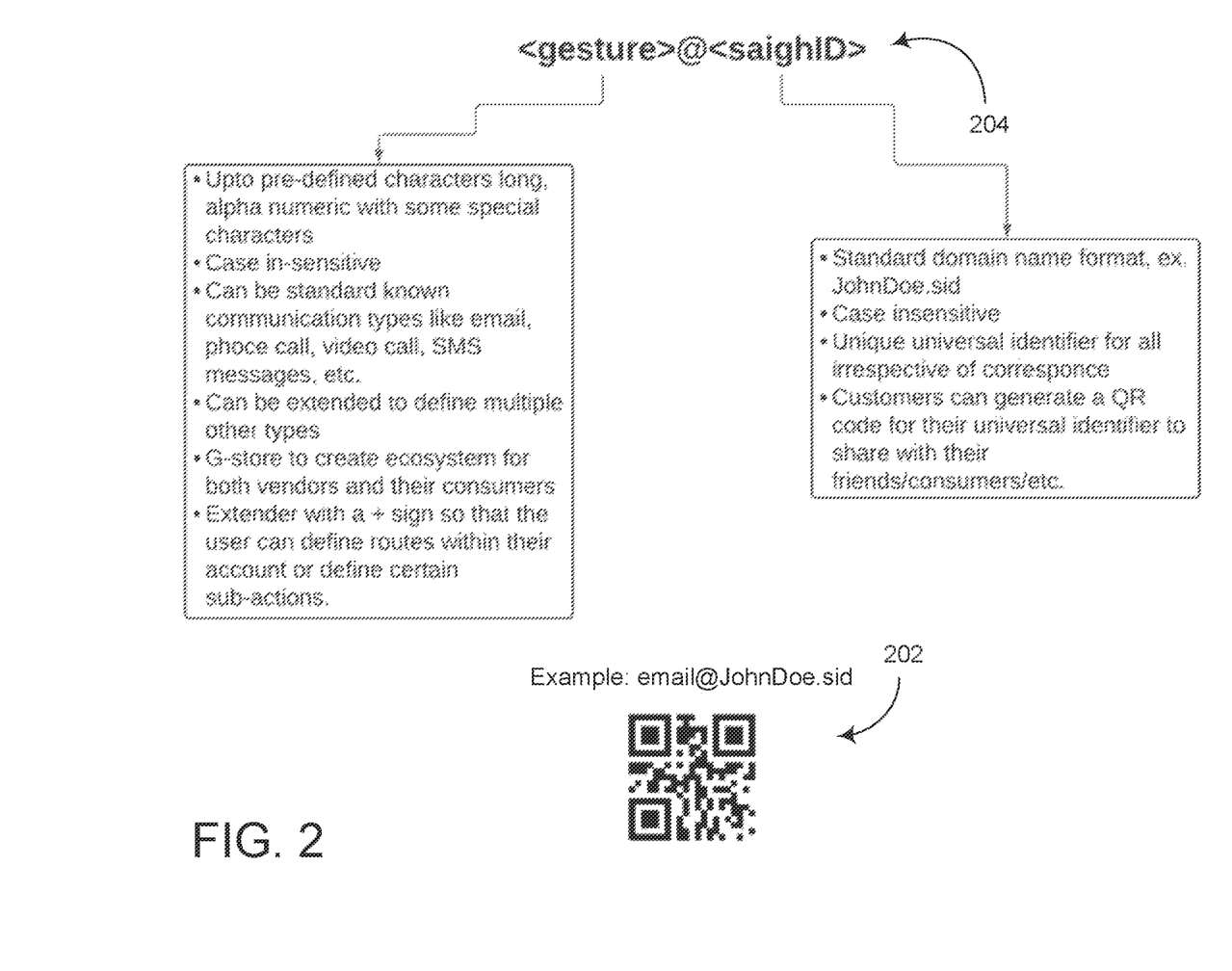
FIG. 2 illustrates an example QR code that encodes information about a user's universal communication identifier.

If the sending user wishes to send an email to the recipient user, the sending user transmits the communication addressed to <gmail>@<recipientuser.xyz> (see additionally FIG. 2). The term "<email>" is referred to herein as a <gesture> that is associated with a particular type of communication exchange technology. The "email" designation informs the universal information exchange system 100 that the sending user is communicating an email type communication. The universal information exchange system 100 can then process the sender's email initial communication, and then redirect the email communication (as the recipient communication) to the recipient's preferred communication exchange technology.

As another non-limiting working example, assume that the sending user wishes to send a SMS (short message service) or MMS (multimedia message service) text message to the recipient user. The sending user transmits the communication addressed to <sms>@<recipientuse.xyz> or <mms>@<recipientuser.xyz> which is processed by the universal information exchange system 100. The "sms" designation informs the universal information exchange system 100 that the sending user is sending a SMS type initial communication to the recipient user using an SMS's enabled device, such as the sender's smart phone or the like. The universal information exchange system 100 can then redirect the content of the SMS/MMS initial communication to the recipient user's electronic device. If the recipient user has indicated that at least one of their preferred electronic devices is SMS/MMS enabled, then the recipient communication may be a SMS/MMS message. If the recipient user prefers another communication exchange technology, such as email, then the recipient communication is sent as an email to the electronic device designated by the recipient user.

In some embodiments, the sending user may simply send send a SMS or MMS text message using an initial communication addressed to "recipientuser.xyz" (or another suitable message directing identifier) so that the initial communication is received by the universal information exchange system 100. The universal information exchange system 100 will determine the type of received message based on attributes associated with the received initial communication. That is, the universal information exchange system 100 will analyze the received initial communication from the sender. The content of the sender's initial communication can then be sent to the recipient's designated communication exchange technology device.

If the communication exchange technology of the sender is the same as the designated communication exchange technology of the recipient, then the content of the sender's initial communication can be communicated to the recipients' electronic device that is configured to receive recipient communications in that format. For example, is the sender is sending a SMS text message, and the recipient has designated their smartphone as a receiving device, then the recipient user's smartphone can receive the SMS message.

In other cases, the SMS or MMS message received from the sender may be reformatted by the universal information exchange system 100 into a recipient communication that is communicated to the recipient's designated device using a different communication exchange technology. For example, if the recipient has specified that communications are to be directed to their email, then the SMS or MMS message may be reformatted into an email message that is sent to the recipient. Alternatively or additionally, the text of the SMS or MMS message may be synthesized into a voice communication by the universal information exchange system 100 and sent to a voice mail message inbox of the recipient if the recipient has designated a telephone as the receiving device. Alternatively, or additionally, the text (and/or images) of the SMS or MMS message may be reformatted and sent to a social media platform that is used by the recipient if the user has designated a particular social media platform that is to be receiving communications. One skilled in the art appreciations that a received communication may be reformatted into any suitable communication exchange technology.

The disclosed systems and methods for the universal information exchange system 100 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, a variety of examples for systems and methods for a universal information exchange system 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components. "Secured to" means directly connected without intervening components.

"Communicatively coupled" means that an electronic device exchanges information with another electronic device, either wirelessly or with a wire based connector, whether directly or indirectly through a communication network 128. "Controllably coupled" means that an electronic device controls operation of another electronic device.

A "device address" is an alpha-numeric phrase or term that identifies a particular electronic device. In the context of computers, the device address may be a media access control (MAC) address, a link-local address, an internet protocol (IP) address, or the like. In the telephony arts, the device address may be the telephone number of a smartphone, telephone, or the like. In the context of websites, the device address is the domain name, uniform resource locator (URL), or the like that is associated with a particular website. When a transmitted communication (or message) is transmitted across a communication network, the device address is used to direct the communication to a particular electronic device that is used by an intended recipient user.

Returning to FIG. 1, embodiments of the universal information exchange system 100 may be implemented using any suitable computing system 102. Note that one or more general purpose virtual or physical computing systems suitably instructed, or a special purpose computing system, may be used to implement a universal information exchange system 100. Further, the universal information exchange system 100 may be implemented in software, hardware, firmware, or in some combination to achieve the capabilities described herein.

Note that one or more general purpose or special purpose computing systems/devices may be used to implement the described techniques. However, just because it is possible to implement the universal information exchange system 100 on a general purpose computing system does not mean that the techniques themselves or the operations required to implement the techniques are conventional or well known.

Embodiments of the universal information exchange system 100 may be implemented on a computer system 102, such as a personal computer, laptop computer, notebook, or other computing device now known or later developed. Some embodiments may be implemented on a smart phone or other mobile electronic device.

The computing system 102 may comprise one or more server and/or client computing systems, and/or may span distributed locations. In addition, each block shown may represent one or more such blocks as appropriate to a specific embodiment or may be combined with other blocks. Moreover, the various blocks of the universal information exchange system 100 may physically reside on one or more machines, which use standard (e.g., transmission control protocol/internet protocol TCP/IP) or proprietary interprocess communication mechanisms to communicate with each other.

In the embodiment shown, computer system 102 comprises a computer memory ("memory") 104, a display 106, one or more Central Processing Units ("CPU") 108, Input/Output devices 110 (e.g., keyboard, mouse, cathode ray tube, CRT or liquid crystal display, LCD display, etc.), other computer-readable media 112, and one or more network connections 114. The universal information exchange system 100 is shown residing in memory 104. In other embodiments, some portion of the contents, some of, or all of the components of the universal information exchange system 100 may be stored on and/or transmitted over the other computer-readable media 112. The components of the universal information exchange system 100 preferably execute on one or more CPUs 108 and manage the universal information exchange system 100, as described herein. Other code or programs 116 and potentially other data repositories, such as data repository 118, may also reside in the memory 104, and preferably execute on one or more CPUs 108. Of note, one or more of the components in FIG. 1 may not be present in any specific implementation. For example, some embodiments embedded in other software may not provide means for user input or display.

In a typical embodiment, the universal information exchange system 100 includes a universal user name generation engine 120, a communication format engine 122, a communication processing engine 124, and a gesture management engine 126. In at least some embodiments, portions of the universal information exchange system 100 may be provided external to the computer system 102, and is available, potentially, over one or more communication networks 128. Other and/or different modules may be implemented. In addition, the universal information exchange system 100 may interact via a network 128 with application or client code 130 that uses results computed by the universal information exchange system 100, one or more client computing systems 132 (such as a mobile electronic device 134, such as a smart phone), and/or one or more third-party information provide systems 136, such as purveyors of information used in platform format data repository 138 and/or the universal name database 140. Also, of note, the platform format data repository 138 and/or the universal name database 140 may be provided external to the computer system 102 as well, for example in a WWW (world wide web) knowledge base accessible over one or more networks 128.

In an example embodiment, components/modules of the universal information exchange system 100 are implemented using standard programming techniques. For example, the universal information exchange system 100 may be implemented as a "native" executable running on the CPU 103, along with one or more static or dynamic libraries. In other embodiments, the universal information exchange system 100 may be implemented as instructions processed by a virtual machine. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., Meta Language, ML, Lisp, Scheme, and the like), procedural (e.g., C, Pascal, Ada, Modula, and the like), scripting (e.g., Perl, Ruby, Python, JavaScript, Virtual Basic Script, VBScript, and the like), and declarative (e.g., Structured Query Language, SQL, Prolog, and the like).

The embodiments described herein may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and communicate using message passing techniques. Equivalent synchronous embodiments are also supported. Also, other functions could be implemented and/or performed by each component/module, and in different orders, and in different components/modules, yet still achieve the described functions.

In addition, programming interfaces to the data stored as part of the universal information exchange system 100 (e.g., in the platform format data repository 138 and/or the universal name database 140) can be available by standard mechanisms such as through C, C++, C#, and Java APIs: libraries for accessing files, databases, or other data repositories: through scripting languages such as XML: or through Web servers, FTP servers, or other types of servers providing access to stored data. The platform format data repository 138 and/or the universal name database 140 may be implemented as one or more database systems, file systems, or any other technique for storing such information, or any combination of the above, including implementations using distributed computing techniques.

Also, the example universal information exchange system 100 may be implemented in a distributed environment comprising multiple, even heterogeneous, computer systems and networks. Different configurations and locations of programs and data are contemplated for use with techniques of described herein. In addition, the [server and/or client] may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, remote procedure call, RPC, remote method invocation, RMI, hypertext transfer protocol, HTTP, Web Services (extensible markup language-remote procedure call, XML-RPC, Java API for XML-based RPC, JAX-RPC, simple object access protocol, SOAP, etc.) and the like. Other variations are possible. Also, other functionality could be provided by each component/module, or existing functionality could be distributed amongst the components/modules in different ways, yet still achieve the functions of a universal information exchange system 100.

Furthermore, in some embodiments, some or all of the components of the universal information exchange system 100 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a digital versatile disk, DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

In practice, a user would create an account in the universal information exchange system 100. The user provides various information to the executing universal user name generation engine 120. A unique universal communication identifier is defined for the registering user, which may be automatically generated by the universal user name generation engine 120. Alternatively, a portion of the universal communication identifier that identifies the user may be specified by the registering user. Accordingly, the generated universal communication identifier is uniquely associated with the user.

The registering user, at some point in time, provides information pertaining to a plurality of different communication exchange technologies that they use. The information may be provided at the time of registration, or at a later time by the user. The user may modify the information at any time. Other supplemental information interest may be provided by the registering user. The registering user's information and their associated universal communication identifier are stored into the universal name database 140.

The registering user may then give out their universal communication identifier to any party that the user would like to receive communications from. In a non-limiting example embodiment, the user can simply give out an image of a QR code, bar code, or other scannable information that has encoded their universal communication identifier (such but not limited as, to, <gesture>@><recipientuser.xyz>).

Any party that wants to send any form of initial communication to a particular recipient user needs to know only the recipient user's universal communication identifier. The sending user can optionally append the type of communication format associated with their communication to that universal communication identifier by specifying the gesture. Alternatively, the communication exchange technology that the sender is using to generate their communication may specify the <gesture>. The initial communication is processed by the universal information exchange system 100 using the indicated form of communication. The sending user's initial communication, based on information identified by the executing communication processing engine 124, can then be forwarded at a recipient communication to a selected electronic device of the recipient user. The communication processing engine 124 manages the flow of communication into and out from the universal information exchange system 100.

The registering user can configure their universal communication identifier account, using the universal user name generation engine 120, in multiple ways to create rules and/or actions that would be triggered when they receive a particular type of communication. These predefined rules and/or actions (interchangeably referred to herein as conditions) are defined herein as preferences. For example, the registering user could specify a phone number as the device address of their mobile electronic device (smart phone), and specify that their smartphone is to receive SMS/MMS text messages. One skilled in the art appreciates that not all mobile electronic devices are suitable to receive SMS/MMS messages. Accordingly, the registering user may predefine a particular electronic device that is to receive the SMS/MMS message. When the condition of the preference is satisfied, the recipient communication can be communicated to the preferred electronic device.

One skilled in the art appreciates that any particular communication exchange technology communicates data in a particular format. Often, the data format is unique to that communication exchange technology (or similar communication exchange technologies). At times, the sending user and recipient user may be attempting to communicate using incompatible communication exchange technologies which use different data formats. Embodiments of the universal information exchange system 100 are configured to reformat data of an initial communication into a recipient communication as needed. To accomplish communication data reformatting, information about the various different communication exchange technologies is retained in the platform format data 138. The executing communication format engine 122 would reformat an initial communication using the format information stored in the platform format data 138 and based on the particular communication exchange technology used by the sending user and the recipient user's communication exchange technology.

In some situations, the sending user may not be sending a form of initial communication that can be received on an electronic device of the recipient user. Rather, the recipient user (when registering to create their unique universal communication identifier, or at any later date by accessing the universal information exchange system 100) may specify a particular electronic device and/or a particular communication exchange technology that is to receive the content of an initial communication. Embodiments of the universal information exchange system 100 may access the platform format data 140 that stores formatting information and device addresses for a plurality of different communication exchange technologies (email formats, voice message communications, SMS/MMS messages, social media platform messages, etc.). The universal information exchange system 100, executing the communication format engine 122 and accessed format informant from the platform format data 138, reformats the incompatible initial communication into a recipient communication that has a format that is compatible with the designated electronic device and/or communication exchange technology of the recipient user (noting that the recipient user's electronic device may be capable of using multiple different communication exchange technologies). The reformatted recipient communication is then communicated to the designated electronic device of the recipient user based on the associated device address.

For example, the recipient user may not have a device that is configured to receive SMS/MMS messages (or might prefer to receive SMS/MMS messages on their computer system 132). The recipient user, at the time of registration or at a previous time, may specify that SMS/MMS text messages are to be sent to a predefined email account of the recipient user. Here, the recipient user's electronic device is identified by its device address and/or is identified by the email address. The SMS/MMS text message is reformatted by the executing communication format engine 122 into an email format that is used by the designated email system of the recipient user. The reformatted recipient communication can then be sent to the recipient user's designated email system based on the device address associated with the email system and/or the recipient user's electronic device.

As another simplified example, the sending user may be trying to establish a phone or video call with the recipient user. The sending user might leave a voice mail message for the recipient user. The communication technology provider 136 that provides the telephony service and voice mail service would forward the voice mail message to the universal information exchange system 100. The universal information exchange system 100 would access the recipient user's information to determine how the recipient user prefers to receive voice mail information. If the recipient user wants to receive a text message corresponding to the voice mail message, the universal information exchange system 100 would convert the voice mail information into text, generate a SMS/MMS text communication, and then transmit the SMS/MMS text recipient communication to an electronic device that has been designated by the recipient user.

In some embodiments, the recipient user may prefer to receive communications at a particular selected one of a plurality of specified destination devices during different times of the day, different days or the week, or any other designated time period. For example, the recipient user may specify a communication preference that indicates that SMS/MMS messages are to be communicated to their smart phone 134 during the predefined hours of the day from 12:00 midnight until 7:00 am, and from 5:00 pm until 12:00 midnight. The recipient user could specify that SMS/MMS messages are to be sent to a designated email of the recipient user during other hours of the day on workweek days (Monday-Friday), such as from 7:00 am until 5:00 pm. Accordingly, the recipient user would not become distracted by incoming SMS/MMS messages that arrive on their smartphone during the workday. Rather, incoming SMS/MMS messages are reformatted into emails for later consumption by the recipient user.

As another example of communication preferences, the recipient user may specify a temporary period of time that specifies that all communications are to be sent to a particular destination device, such as when they are travelling in an aircraft or other vessel, are in a meeting, or are at some other event that they do not wish to receive potentially distracting SMS/MMS messages. Upon expiration of the recipient user specified time period, the communication delivery instructions revert to the standard user defined destination devices. Any suitable communication preference may be predefined by a client recipient user.

Some embodiments may be configured to provide notifications to the recipient user and/or the sending user regarding the communications managed by the universal information exchange system 100. Communication sending and/or destination devices, and/or communication formats, may be indicated to either of the recipient user and/or the sending user. For example, the sending user may transmit an email type communication to the recipient user. Based on predefined instructions stored in the universal name database 140 that are associated with the recipient user, the universal information exchange system 100 may reformat the email message into a SMS/MMS message and transmit the reformatted message to the recipient user's designated electronic device. Optionally, the universal information exchange system 100 may return a reply message to the sending user indicating that their original email messages was sent to the recipient smartphone as a SMS/MMS type message. Here, the reply message may be sent directly to the sending user's electronic device. Alternatively, or additionally, the reply message may be sent to the sender using their own unique universal communication identifier in accordance with predefined instructions associate with the sending user.

The gesture management engine 126 enables the operators of the universal information exchange system 100 to perform various operations as needed to operate the universal information exchange system 100. Here, the gesture management engine 126 determines the type of format of an incoming communication.

In some embodiments, programming updates may be implement using the gesture management engine 126 or another engine. For example, embodiments of the universal information exchange system 100 may reside on a user computing system, on a smart phone, or an electronic device of a communication technology provider 136.

FIG. 2 illustrates an example universal communication identifier QR (quick response) code 202 that encodes information about a user's universal communication identifier. FIG. 2 also conceptually illustrates a non-limiting exemplary universal communication identifier having the form of <gesture>@<saighID>204. Any suitable form of a universal communication identifier may be used by the various embodiments.

The user may forward an image of the universal communication identifier QR code to another party that may become a sending user. Alternatively, or additionally, a sending user could take a picture of (acquire) the image of universal communication identifier QR code 202 using their smart phone so that the initial communication can be generated using the universal communication identifier residing in the universal communication identifier QR code 202. Alternatively, or additionally, the universal communication identifier QR code 202 may be printed on a physical media, such as a business card, letter head or the like, that the recipient user could provide to a sending user. One skilled in the art appreciates that a relatively large amount of information, including computer readable instructions that control operating of an electronic device, may be encoded into a QR code 202.

The universal communication identifier QR code 202 contains encoded information that can be read by an electronic device to extract the recipient user's unique universal communication identifier. Accordingly, each user of the universal information exchange system 100 will have their own unique universal communication identifier QR code 202. Preferably, the unique universal communication identifier QR code 202 is generated and associated with the user when they initially register with the universal information exchange system 100 by the universal user name generation engine 120 (FIG. 1). However, the universal communication identifier QR code 202 may be generated at any time. The universal communication identifier QR code 202 may be saved into the universal name database 140, or may be generated based on the stored user information on an as-needed basis.

Use of a universal communication identifier QR code 202 provides several unexpected advantages. Since the universal communication identifier QR code 202 can be configured to control operations of an electronic device, the universal communication identifier QR code can be used to manipulate operations of the sender's electronic device.

As a first non-limiting illustrative example, when the sender scans the universal communication identifier QR code 202 on their electronic device, such as a smartphone, the universal communication identifier QR code 202 may cause the sending user's device to download the universal information exchange system 100, or a portion thereof, as an application, APP. The downloaded APP may be configured to facilitate communications based on a universal communication identifier. For example, if the sending user generates a SMS/MMS type communication that includes an intended recipient user's universal communication identifier, and then scans or otherwise acquired the QR code 202, then the APP would transmit the communication to the universal information exchange system 100. The universal information exchange system 100 can identify the intended recipient user, and then direct the SMS/MMS communication to an electronic device of the intended recipient user.

The non-limiting exemplary universal communication identifier having the form of <gesture>@<saighID> 204 in FIG. 2 includes various characteristics of the <gesture> portion of the universal communication identifier. An example universal communication identifier is conceptually illustrated "email@JohnDoe.sid" in FIG. 2. The <gesture> may have predefined terms with alpha numeric and/or special characters, may be case insensitive or case sensitive, can identify well known communication exchange technologies (email, phone calls, SMS/MMS messages, etc.), can be extended to define a plurality of communication exchange technologies, store information (ecosystem) for both vendors and their consumers, and may employ a "+" sign extender (or other predefined suitable special character) that can define routes within their account and/or define certain sub-actions.

The "<saighID>" portion of the exemplary universal communication identifier 204 may include standard domain names, may be case insensitive or case sensitive, and employ a unique universal identifier of all communications irrespective of the form of the correspondence. This portion can be used by a user to generate the example universal communication identifier QR code 202.

Figure 3:
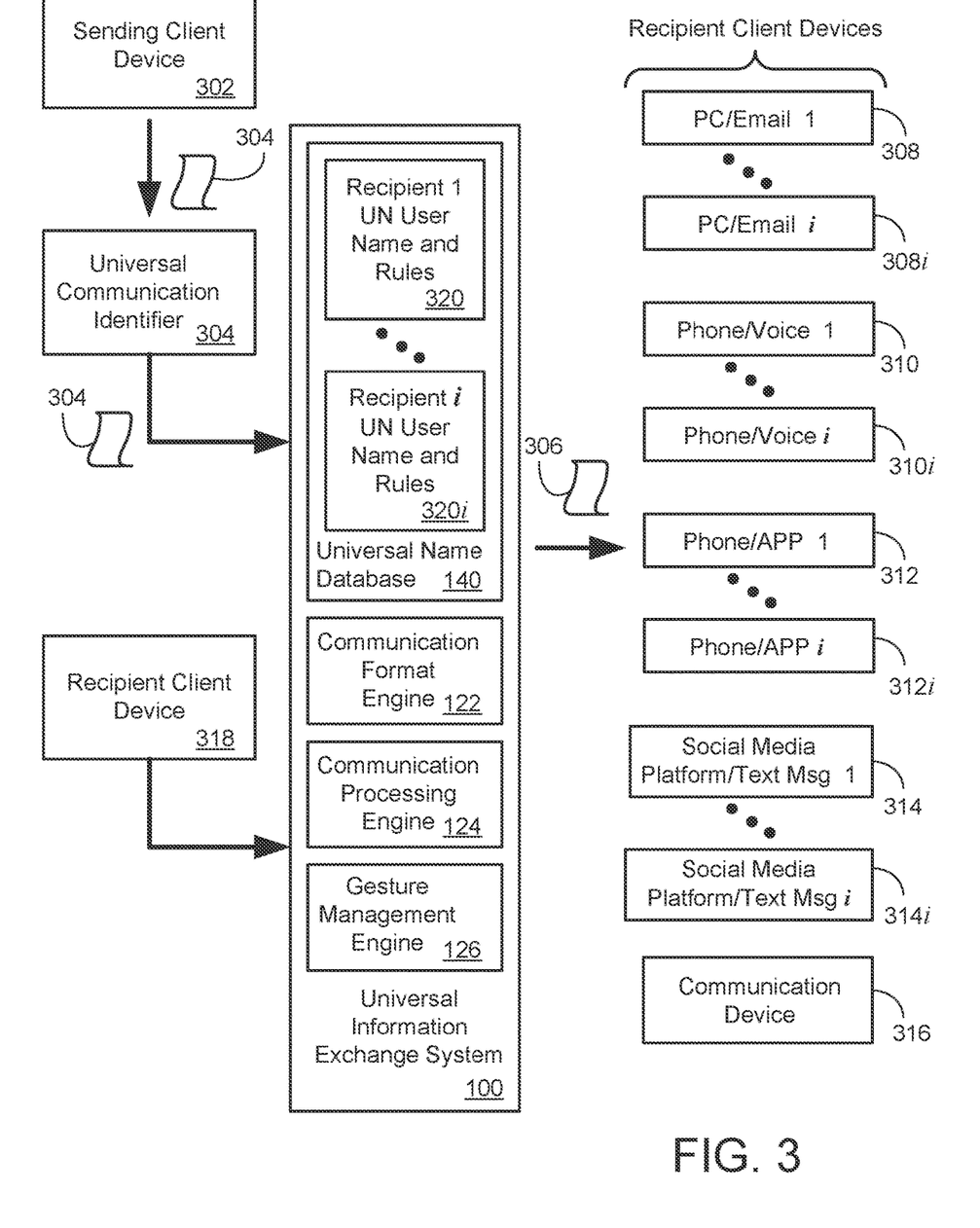
FIG. 3 is a flow diagram conceptually illustrating an example non-limiting operation of an embodiment of the universal information exchange system.

FIG. 3 is a flow diagram conceptually illustrating an example non-limiting operation of an embodiment of the universal information exchange system 100. Here, an electronic device 302 of the sending user is used to generate an initial communication 304 (message) using a selected communication exchange technology. The initial communication 304 includes, in header information or in the body portion of the message, the universal communication identifier that identifies the intended recipient user.

The incoming initial communication 304 is received by the universal information exchange system 100. Based on the <gesture> portion of the universal communication identifier 304, the universal information exchange system 100 determines characteristics of the incoming communication 304. More particularly, the type of communication exchange technology that was used to generate the initial communication 302 by the sending user is identified by the example gesture management engine 126.

Based on the "<saighID>" portion of the universal communication identifier included with the universal communication identifier 304, the communication processing engine 124 identifies the intended recipient user. The communication processing engine 124 may then retrieve information associated with the intended recipient user. Such information may include one or more preferred communication exchange technologies, and/or identify preferred electronic devices of the intended recipient user. The information is used to identify the particular electronic device of the recipient user so that the content of the initial communication 302 can be communicated to the recipient user using a suitable recipient communication 306.

The retrieved information associated with the intended recipient user may include a preferred communication exchange technology of the identified electronic device that is to receive the content of the initial communication 302. The communication format engine 122 formats the content of the initial communication 302 into a format that is used by the identified communication exchange technology preferred by the recipient user. (If the format of the initial communication 302 is the same as the format of the identified communication exchange technology used by the electronic device of the intended recipient user, reformatting of the content may not be required.)

Then, the communication processing engine 124 then generates a recipient communication 306 that is transmitted from the universal information exchange system 100 to the identified electronic device preferred by the intended recipient user, where the format of the recipient communication 306 is configured for the identified communication exchange technology being used by the intended recipient user's identified electronic device. Any suitable electronic device may be selectable by the intended recipient user, such as, but not limited to, a computer 308 that is configured to receive email, a telephonic device 310 that is configured to receive voice communications, a smartphone 312 with an APP that is connected to receive SMS/MMS messages, a computing device 314 with a resident social media platform that is configured to receive text communications, or any other suitable communication device 316.

Further, it is often the situation that the intended recipient user has more than one particular type of electronic device that they wish to use to receive the recipient communication 306, particularly during specified times of the day or on particular specified days. For example, the intended recipient user may wish to receive email format recipient communications 306 on their work PC 308 during working hours, and receive email format recipient communications 306 on their personal home laptop computer 308*i*.

In some embodiments, the intended recipient user may predefine preferred electronic devices and/or preferred communication exchange technologies depending upon the particular sending user. Here, the universal information exchange system 100 identifies the sending user. If the intended recipient user has specified a particular electronic device and/or particular communication exchange technology that is to be used for receiving the content of the initial communication 302 from that particular sender, then the universal information exchange system 100 generates and transmits the recipient communication 306 in accordance with those predefined preferences. These preferences regarding the sending user are saved as preference information in the universal name data base 140 that is associated with the intended recipient user.

For example, a first sending user may be a business associate of the recipient user and a second sender may be a personal friend or relative of the recipient user. The recipient user may specify that some types of communications received from the first sender be transmitted to a business oriented social media site 314 such that the business oriented social media site presents the message content from the first sending user using the proprietary communication exchange technology used by the business related social media platform 314. In contrast, the recipient user may specify that initial communications received from the second sender be transmitted to a socially oriented social media site 314*i* such that the socially oriented social media site presents the message content from the second sending user using the proprietary communication exchange technology used by the socially related social media platform 314*i*.

As noted herein, a recipient user may specify various preferences for their electronic devices that are to receive a recipient communication 306, and/or specify the preferred communication exchange technology that is to process and present the content of the received recipient communication 306. In practice, a user logs into a user session on the universal information exchange system 100 using a recipient client device 318 of their choice. Communication preferences may be specified by the user using the client device 318, and then communicated to the universal information exchange system 100. The preferences are then saved into the recipient universal name (UN) user name and rules 320 portion of the universal name database 140 that is associated with that particular user.

Information for many users, either persons or organizations, may be saved by embodiments of the universal information exchange system 100. Further, some users may be a sending user when they use another user's universal communication identifier for communicated messages. At other times, the same user may be a recipient user when another user sends a communication using that user's universal communication identifier.

One skilled in the art appreciates that the example universal information exchange system 100, or portions thereof, as illustrated in FIG. 3 may be implemented in a remote electronic device or system. Alternatively, or additionally, the example universal information exchange system 100, or portions thereof, as illustrated in FIG. 3 may be implemented in the electronic device being used by the sending user.

Figure 4:
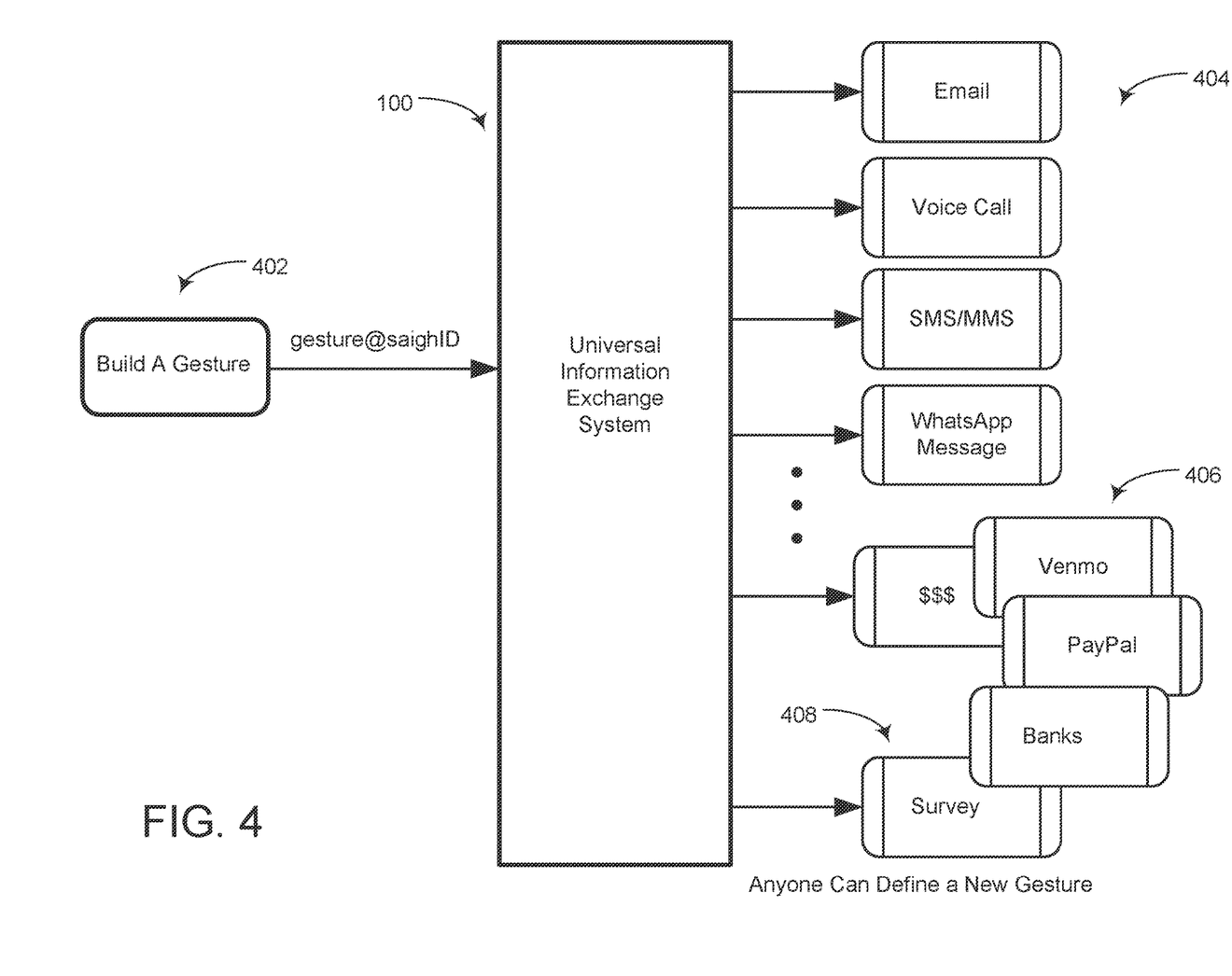
FIG. 4 is a conceptual block diagram of an embodiment of the universal information exchange system.

FIG. 4 is a conceptual block diagram of an embodiment of the universal information exchange system 100. In the illustrated conceptual diagram of FIG. 4, a gesture is built 402 (noting that anyone, such as an individual or an organization, can build a gesture). Communications are directed to a recipient user using the universal communication identifier "gesture@saighID" (wherein the gesture indicates at least the communication format used by the sending user's electronic device, and "saighID" is a unique identifier associated with the recipient user such that the unique universal communication identifier is generically "gesture@recipientuserID"). The universal information exchange system 100 then processes a communication from a sending user so that the processed communication is receivable by an electronic device of the intended recipient user. The gesture may define the communication type 404, such as, but not limited to, Email messages, Voice Calls, SMS/MMS texts, or Whats App messages. Any suitable communication exchange technology, now known or later developed, may be used as the communication type 404 for transmitting sender messages or recipient messages in the various embodiments.

Monetary funds may also be electronically transferred to/from a recipient user. Recipient users may be individual or organizations that receive funds using a particular communication exchange technology 406, such as, but not limited to, Venmo, PayPal, or proprietary Bank technologies. Any suitable electronic funds communication exchange technology, now known or later developed, may be used as the communication type 406 for transmitting electronic funds in the various embodiments. Here, the initial communication is processed into a recipient communication with content that controls a transfer of electronic funds between the sending user and the organization. Since the financial communication exchange technologies 406 employ their own universal communication identifiers, one skilled in the art appreciates that these organizations have preregistered with the universal information exchange system 100.

As yet another non-limiting example use of the universal information exchange system 100, a sending user may respond to a survey 408. A survey 408 is a type of questionnaire, typically interactive, that is sent to an individual (here, conceptually understood to be the sending party). The sending part may respond to the questionnaire by answering one or more survey questions. The back-and-forth communications between the sending party and the survey organization can be managed by use of the universal communication identifiers that identify the sending party and the survey organization.

It should be emphasized that the above-described embodiments of the universal information exchange system 100 are merely possible examples of implementations of the invention. Many variations and modifications may be made to the above-described embodiments. All such modifications and variations are intended to be included herein within the scope of this disclosure and protected by any later filed claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

Therefore, having thus described the invention, at least the following is claimed:

1. A communication exchange system, comprising:
    a first electronic device that generates an initial communication initiated by a sending user, wherein the initial communication comprises:
        content that the sending user communicates to a recipient user; and
        a universal communication identifier that is associated with the recipient user,
        wherein the universal communication identifier includes information that identifies the recipient user and a gesture;
    where the gesture defines a communication exchange technology for which the communication exchange system uses configured information including one or more different phone numbers, one or more different email accounts, or a different handle for each one of a plurality of different social media platforms;
    a second electronic device that is one of a plurality of recipient electronic devices used by the recipient user to receive a recipient communication; and
    a universal information exchange system, comprising:
        a universal name database residing in a memory, wherein the universal name database includes, for each of a plurality of different users:
            a unique universal communication identifier;
            a unique device address for each one of the plurality of recipient electronic devices; and
            format information associated with each one of the plurality of recipient electronic devices;
        a communication processing engine that receives the initial communication from the first electronic device; and
        a communication format engine that formats the recipient communication into a format of a communication exchange technology platform that is executing on the second electronic device,
    wherein the communication processing engine identifies the recipient user based on the universal communication identifier that is included in the initial communication,
    wherein the communication processing engine identifies the second electronic device from the plurality of recipient electronic devices based on a predefined preference specified by the recipient user;
    wherein the recipient communication comprises:
        the content of the initial communication; and
        a device address of the identified second electronic device used by the recipient user,
    wherein the communication format engine formats the recipient communication based on a communication format used by the identified second electronic device, and
    wherein the communication processing engine transmits the recipient communication to the identified second electronic device based on the device address of the second electronic device, and further comprising:
    a gesture management engine,
    wherein a communication format used by the first electronic device is identified in the initial communication using the gesture that is identified by the gesture management engine, and
    wherein the unique universal communication identifier includes the gesture and a unique recipient identifier, and
    wherein the unique universal communication identifier is in the form of "gesture@recipientuserID".

2. The communication exchange system of claim 1, wherein the universal information exchange system is integrated into the first electronic device, and wherein the first electronic device comprises:
    a network connection that communicatively couples the first electronic device to the second electronic device via a communication network.

3. The communication exchange system of claim 1, wherein the universal information exchange system comprises:
    a network connection,
    wherein the network connection communicatively couples the universal information exchange system to the first electronic device via a communication network, and
    wherein the network connection communicatively couples the universal information exchange system to the second electronic device via the communication network.

4. The communication exchange system of claim 1, wherein the first electronic device is a smartphone, wherein the initial communication is one of a SMS (short message service) or MMS (multimedia message service) text message,
    wherein the second electronic device is a computer that receives email messages,
    wherein the communication format engine processes the initial communication into an email message format, and
    wherein the recipient communication is an email message that includes the text message of the initial communication.

5. The communication exchange system of claim 1, wherein the second electronic device is one of a computer or a smartphone that communicatively couples the second electronic device of the recipient user to a social media platform,
    wherein the communication format engine processes the initial communication into a message that is formatted for the social media platform, and
    wherein the recipient communication is a message that is communicated to the social media platform and that identifies the recipient user by a user name associated with the recipient user.

6. The communication exchange system of claim 1, wherein the second electronic device is a computer of an organization, and
    wherein the communication format engine processes the initial communication into the recipient communication with content that transfers electronic funds between the sending user and the organization.

7. The communication exchange system of claim 1, wherein the universal information exchange system comprises:
a universal user name generation engine,
wherein the universal user name generation engine generates the universal communication identifier in response to a request by the recipient user,
wherein the generated universal communication identifier is uniquely associated with the recipient user, and
wherein the generated universal communication identifier is stored into the universal name database.

8. The communication exchange system of claim 1, wherein the universal information exchange system comprises:
a universal user name generation engine,
wherein the universal user name generation engine generates the universal communication identifier that is uniquely associated with the recipient user, and
wherein the universal user name generation engine generates a universal communication identifier quick response (QR) code that includes the universal communication identifier.

9. The communication exchange system of claim 8, wherein the first electronic device generates the initial communication in response to acquiring an image of the universal communication identifier QR code, and
wherein the first electronic device acquires the universal communication identifier from the universal communication identifier QR code.

10. The communication exchange system of claim 1,
wherein the recipient user specifies the plurality of recipient electronic devices to the universal information exchange system,
wherein the recipient user specifies a unique device address for each one of the plurality of recipient electronic devices,
wherein the recipient user specifies a preference that the second electronic device of the plurality of recipient electronic devices is to receive the recipient communication, and
wherein the second electronic device receives the recipient communication when a condition of the preference is satisfied.

11. The communication exchange system of claim 1,
wherein the sending user is a first individual, and
wherein the recipient user is an individual.

12. The communication exchange system of claim 1,
wherein the sending user is a first individual, and
wherein the recipient user is an organization.

13. A method of exchanging communications, comprising
receiving an initial communication from a first electronic device that has been initiated by a sending user, wherein the initial communication comprises:
content that the sending user communicates to a recipient user; and
a universal communication identifier that is associated with the recipient user,
wherein the universal communication identifier includes information that identifies the recipient user and a gesture; where the gesture defines a communication exchange technology for which the communication exchange system uses configured information including one or more different phone numbers, one or more different email accounts, or a different handle for each one of a plurality of different social media platforms
identifying the recipient user from a plurality of uniquely identified recipient users based on the universal communication identifier that is included in the initial communication;
identifying a second electronic device that is one of the plurality of recipient electronic devices used by the recipient user to receive a recipient communication;
generating a recipient communication that includes the content; and
communicating the recipient communication to the identified second electronic device and further comprising:
a gesture management engine,
wherein a communication format used by the first electronic device is identified in the initial communication using the gesture that is identified by the gesture management engine, and
wherein the unique universal communication identifier includes the gesture and a unique recipient identifier, and
wherein the unique universal communication identifier is in the form of "gesture@recipientuserID;"
and wherein, the universal communication identifier includes gesture information that identifies a first format of a first communication exchange technology platform that was used by the first electronic device to generate the initial communication, and further comprises:
reformatting the content in the initial communication to a second format used by a second communication exchange technology platform used by the second electronic device, and generating the initial communication at the first electronic device; and identifying the recipient user using the universal communication identifier that is associated with the recipient user, and acquiring, at the first electronic device, an image of a universal communication identifier quick response (QR) code, wherein the first electronic device acquires the universal communication identifier from the universal communication identifier QR code.

* * * * *